United States Patent
Lewis et al.

(10) Patent No.: US 7,097,787 B2
(45) Date of Patent: Aug. 29, 2006

(54) UTILIZATION OF MICRO-CHANNEL GAS DISTRIBUTOR TO DISTRIBUTE UNREACTED FEED GAS INTO REACTORS

(75) Inventors: Guy H. Lewis, Ponca City, OK (US); Chien-Ping Pan, Ponca City, OK (US); Harold A. Wright, Ponca City, OK (US); David H. Anderson, Ponca City, OK (US); David M. Minahan, Stillwater, OK (US); Vincent H. Melquist, Ponca City, OK (US); Cemal Ercan, Tulsa, OK (US); Gloria I. Straguzzi, Ponca City, OK (US); Stephen R. Landis, Katy, TX (US); Phillipp R. Ellison, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 378 days.

(21) Appl. No.: 10/619,698

(22) Filed: Jul. 15, 2003

(65) Prior Publication Data

US 2004/0067180 A1    Apr. 8, 2004

Related U.S. Application Data (60) Provisional application No. 60/397,227, filed on Jul. 19, 2002.

(51) Int. Cl.
*C01B 3/36* (2006.01)
*C01B 3/38* (2006.01)

(52) U.S. Cl. ............ 252/373; 366/150.1; 366/177.1; 366/181.6; 366/348; 423/659

(58) Field of Classification Search ............ 585/658; 423/576.8, 659; 252/373; 366/348, 181.6, 366/177.1, 150.1
See application file for complete search history.

(56) References Cited

U.S. PATENT DOCUMENTS

| | | | |
|---|---|---|---|
| 3,996,025 A | 12/1976 | Gulden | 48/107 |
| 4,665,975 A | 5/1987 | Johnston | 165/167 |

(Continued)

FOREIGN PATENT DOCUMENTS

DE    3731988 A1    9/1987

(Continued)

OTHER PUBLICATIONS

*The PCHE Opportunity—Construction* [online]. Retrieved from the Internet:<URL: http://www.heatric.com (8 p.) 2002, no month.

(Continued)

*Primary Examiner*—Wayne A. Langel
(74) *Attorney, Agent, or Firm*—Conley Rose P.C.

(57) ABSTRACT

A method of partially oxidizing a feed gas comprises providing a reactor containing a catalyst, providing a gas distributor comprising a body having a plurality of channels therethrough and a plurality of outlets from said channels for distributing gas across the catalyst, feeding the feed gas and the oxygen-containing gas into the gas distributor and allowing the feed gas and the oxygen-containing gas to flow through the gas distributor and out through the outlets into contact with the catalyst. The gas distributor preferably comprises a micro-channel gas distributor, which can be assembled by providing a plurality of etched plates defining flow channels, and stacking and fusing the plates. The reactant gases can be mixed within the gas distributor or maintained separately until they have exited the gas distributor.

29 Claims, 4 Drawing Sheets

U.S. PATENT DOCUMENTS

| | | | |
|---|---|---|---|
| 4,864,820 A | 9/1989 | Wynosky et al. | 60/270.1 |
| 4,940,826 A * | 7/1990 | Font Freide et al. | 585/600 |
| 5,098,690 A * | 3/1992 | Koves | 423/659 |
| 5,193,611 A | 3/1993 | Hesselgreaves | 165/165 |
| 5,365,006 A * | 11/1994 | Serrand | 585/501 |
| 5,639,929 A * | 6/1997 | Bharadwaj et al. | 585/658 |
| 5,727,618 A | 3/1998 | Mundinger et al. | 165/80.4 |
| 5,883,138 A * | 3/1999 | Hershkowitz et al. | 518/703 |
| 5,935,489 A * | 8/1999 | Hershkowitz et al. | 252/373 |
| 6,167,952 B1 | 1/2001 | Downing | 165/167 |
| 6,267,912 B1 | 7/2001 | Hershkowitz et al. | 252/373 |
| 6,289,977 B1 | 9/2001 | Claudel et al. | 165/157 |
| 6,321,541 B1 | 11/2001 | Wrubel et al. | 60/740 |
| 6,833,126 B1 * | 12/2004 | Komaki et al. | 423/652 |

FOREIGN PATENT DOCUMENTS

| | | |
|---|---|---|
| EP | 0303439 | 8/1989 |
| WO | WO01/76731 A1 | 10/2001 |
| WO | WO02/06154 A1 | 1/2002 |

OTHER PUBLICATIONS

*Heatric PCHEs Compact Heat Exchange* Brochure as least as early as May 2003 (16 p.).

* cited by examiner

UTILIZATION OF MICRO-CHANNEL GAS DISTRIBUTOR TO DISTRIBUTE UNREACTED FEED GAS INTO REACTORS

CROSS-REFERENCE TO RELATED APPLICATIONS

The present invention claims priority to U.S. Provisional Application Ser. No. 60/397,227, filed Jul. 19, 2002, and entitled "Utilization of Micro-Channel Gas Distributor to Distribute Unreacted Feed Gas into Reactors," which is incorporated herein in its entirety.

STATEMENT REGARDING FEDERALLY SPONSORED RESEARCH OR DEVELOPMENT

Not applicable.

TECHNICAL FIELD OF THE INVENTION

The present invention generally relates to a device for safely mixing unreacted feed gases prior to feeding them into a reactor. More specifically, the present invention relates to the use of a micro-channel gas distributor to mix, contain, and/or distribute reactive feed gases onto a catalytic surface.

BACKGROUND OF THE INVENTION

The quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas intermediate is converted to higher hydrocarbon products by processes such as the Fischer-Tropsch Synthesis. For example, fuels with boiling points in the middle distillate range, such as kerosene and diesel fuel, and hydrocarbon waxes may be produced from the synthesis gas.

Current industrial use of methane as a chemical feedstock proceeds by the initial conversion of methane to carbon monoxide and hydrogen by either steam reforming, which is the most widespread process, or by dry reforming or by autothermal reforming. Steam reforming currently is the major process used commercially for the conversion of methane to synthesis gas, proceeding according to Equation 1.

Although steam reforming has been practiced for over five decades, efforts to improve the energy efficiency and reduce the capital investment required for this technology continue. For many industrial applications, the 3:1 ratio of $H_2$:CO products is problematic, and the typically large steam reforming plants are not practical to set up at remote sites of natural gas formations.

Methane residence times in steam reforming are on the order of 0.5–1 second, whereas for heterogeneously catalyzed partial oxidation, the residence time is on the order of a few milliseconds. For the same production capacity, syngas facilities for the partial oxidation of methane can be far smaller, and less expensive, than facilities based on steam reforming. A recent report (M. Fichtner et al. *Ind. Eng. Chem. Res.* (2001) 40:3475–3483) states that for efficient syngas production, the use of elevated operation pressures of about 2.5 MPa is required. Those authors describe a partial oxidation process in which the exothermic complete oxidation of methane is coupled with the subsequent endothermic reforming reactions (water and $CO_2$ decomposition). This type of process can also be referred to as autothermal reforming or ATR, especially when steam is co-fed with the methane. Certain microstructured rhodium honeycomb catalysts are employed which have the advantage of a smaller pressure drop than beds or porous solids (foams) and which resist the reaction heat of the total oxidation reaction taking place at the catalyst inlet. The honeycomb is made by welding together a stack of rhodium foils that have been microstructured by means of wire erosion or cutting.

The catalytic partial oxidation ("CPOX") or direct partial oxidation of hydrocarbons (e.g. natural gas or methane) to syngas has also been described in the literature. In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

This ratio is more useful than the H2:CO ratio from steam reforming for the downstream conversion of the syngas to chemicals such as methanol or to fuels. Furthermore, oxidation reactions are typically much faster than reforming reactions. This allows the use of much smaller reactors for catalytic partial oxidation processes than is possible in a conventional steam reforming process.

While its use is currently limited as an industrial process, the exothermic direct partial oxidation or CPOX of methane has recently attracted much attention due to its inherent advantages, such as the fact that due to the significant heat that is released during the process, there is no requirement for the continuous input of heat in order to maintain the reaction, in contrast to steam reforming processes.

The current interest in partial oxidation processes has resulted in various improvements in the technologies associated with that process, including catalyst composition, catalyst structure, reactor structure, and operating parameters. One aspect that has not received as much attention is the technology associated with the injection of feed gases into the partial oxidation reactor. In particular, it is necessary to feed methane and an oxygen-containing gas into the reactor under conditions of elevated temperature and pressure. The same feed conditions that are conducive to efficient operation of the partial oxidation process, however, are conducive to reactions that are less desirable, and possibly even hazardous, such as the ignition and combustion of the feedstock. At the same time, it is desirable to mix the feed gases as completely as possible, to as to maximize the efficiency of the catalytic reaction. It is particularly desirable to avoid pre-reaction and pre-ignition of the gases.

As described in U.S. Pat. No. 6,267,912, which is incorporated herein by reference, catalytic partial oxidation processes attempt to eliminate gas phase oxidation reactions entirely, so that all of the partial oxidation reactions take place on the catalyst surface. The reactants are contacted with the catalyst at a very high space velocity, so that gas phase reactions are minimized. Gas phase reactions are undesirable because they can increase the occurrence of undesired combustion reactions (producing steam and carbon dioxide), damage the catalyst, and accelerate its deactivation.

Hence, there is a need for a method and apparatus for mixing partial oxidation feed gases that achieves thorough mixing, and if necessary preheat, and provides an even distribution of the mixed gases across the catalyst surface, while minimizing or preventing undesired gas phase reactions.

SUMMARY OF THE INVENTION

The present invention provides a method and apparatus for mixing partial oxidation feed gases. The present invention can be used for mixing partial oxidation feed gases or other gases, such as reactants for use in a catalyzed reaction. The present invention provides an apparatus that achieves thorough mixing of the feed gases and can be used to preheat or precool the feed gases if necessary, while minimizing or preventing undesired gas phase reactions. In particular, the present invention entails using a micro-channel gas distributor in a preferred manner to accomplish thorough mixing of methane and an oxygen-containing gas.

In one embodiment, the micro-channel gas distributor is positioned slightly upstream of the catalyst and is used only to distribute each feed gas evenly across the catalyst surface, with mixing occurring after the gases leave the gas distributor. In another embodiment, the micro-channel gas distributor is positioned immediately upstream of the catalyst and is used both to mix the feed gases and to distribute them across the catalyst surface.

In either embodiment, the micro-channel gas distributor can include an additional flow path that is separate from the flow paths of the feed gases and contains a heating or cooling fluid, so that the temperature of the feed gases is adjusted as they pass through the micro-channel gas distributor. The present invention preserves feed integrity, minimizes premature gas-phase reactions and reduces the occurrence of reactant pre-ignition.

Similarly, the reactor system in which the present gas distributor is used can be operated with or without recycle. If present, the recycle line can be an additional feed into the gas distributor and mixed with the reactor streams inside the gas distributor, or it can be added to one of the feed streams upstream of the gas distributor.

As used herein, the term "micro-channel gas distributor" refers to devices such as those discussed in detail below, each comprising an essentially monolithic body having a plurality of microchannels in a prescribed pattern therethrough.

Downstream of the present micro-channel gas distributor, the gases mixed in the micro-channel gas distributor or distributed by the micro-channel gas distributor and mixed upon exiting the gas distributor can be reacted on any suitable partial oxidation catalyst and under any suitable partial oxidation conditions, such as are known in the art.

Under autothermal process conditions there is no external heat source required to the partial oxidation reaction. The net partial oxidation reaction conditions are promoted by optimizing the concentrations of hydrocarbon and $O_2$ in the reactant gas mixture, preferably with a mole ratio in the range of from about 1.5:1 to about 3.3:1 carbon:$O_2$. In some embodiments, steam may also be added to produce extra hydrogen and to control (i.e., reduce) the outlet temperature. The steam can be added as an additional flow stream in the gas distributor, can be premixed with one of the feed gases upstream of the gas distributor, or can be added separately, as desired. Regardless, it is preferred that the ratio of steam to carbon (by weight) range from 0 to 3.

Pressure, residence time, amount of feed preheat and amount of nitrogen dilution, if used, also affect the reaction products. The process also preferably includes maintaining a catalyst residence time of no more than about 100 milliseconds for the reactant gas mixture and in some reactor schemes even less. This is accomplished by passing the reactant gas mixture over, or through the porous structure of the catalyst system at a gas hourly space velocity of about 20,000–100,000,000$h^{-1}$, preferably about 100,000–25,000,000$h^{-1}$. In preferred embodiments of the process, the catalyst system catalyzes the net partial oxidation of at least 80% of a methane feedstock to CO and $H_2$ with a selectivity for CO and $H_2$ products of at least about 80% CO and 80% $H_2$.

In certain embodiments of the process, the step of maintaining net partial oxidation reaction promoting conditions includes keeping the temperature of the reactant gas mixture at about 30° C.–750° C. and keeping the temperature of the catalyst at about 600–2,000° C., preferably between about 600–1,600° C., by self-sustaining reaction. In some embodiments, the process includes maintaining the reactant gas mixture at a pressure of about 100–40,000 kPa (about 1–40 atmospheres), preferably about 200–30,000 kPa (about 2–30 atmospheres), and still more preferably between about 8 and 29 atmospheres, while contacting the catalyst.

In some embodiments, the process comprises mixing a methane-containing feedstock and an O2-containing feedstock together in a carbon:$O_2$ molar ratio of about 1.5:1 to about 3.3:1, preferably about 1.7:1 to about 2.1:1, and more preferably about 2:1. Preferably the methane-containing feedstock is at least 80% methane, more preferably at least 90%. These and other embodiments, features and advantages of the present invention will become apparent with reference to the following description and drawings.

BRIEF DESCRIPTION OF THE DRAWINGS

For a more detailed understanding of the preferred embodiments, reference is made to the accompanying drawings, wherein.

DETAILED DESCRIPTION OF PREFERRED EMBODIMENTS

Figure 1:
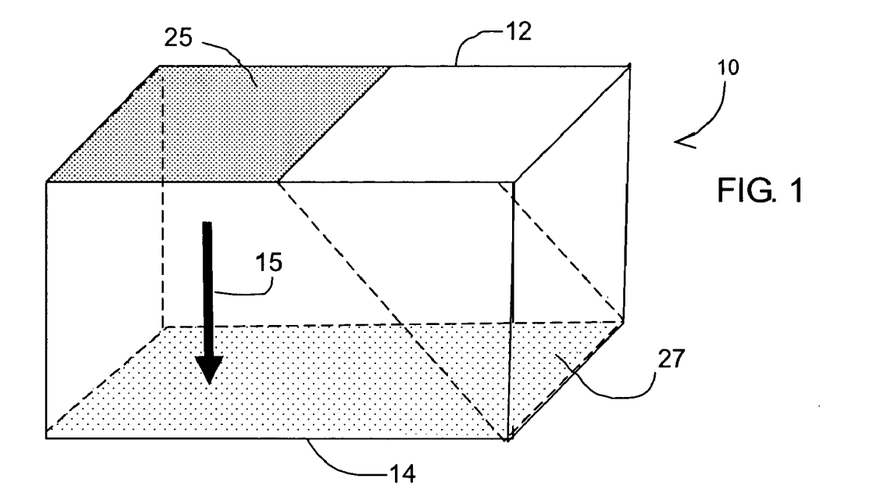
FIG. 1 is a schematic diagram of a micro-channel gas distributor in accordance with the present invention.

Referring initially to FIG. 1, a micro-channel gas distributor 10 is shown schematically. Distributor 10 preferably has an upstream face 12, and a downstream face 14. Distributor 10 is preferably constructed by forming a plurality of flow channels into each of a plurality of plates (not shown in FIG. 1) and stacking the plates as described below.

Figure 2:
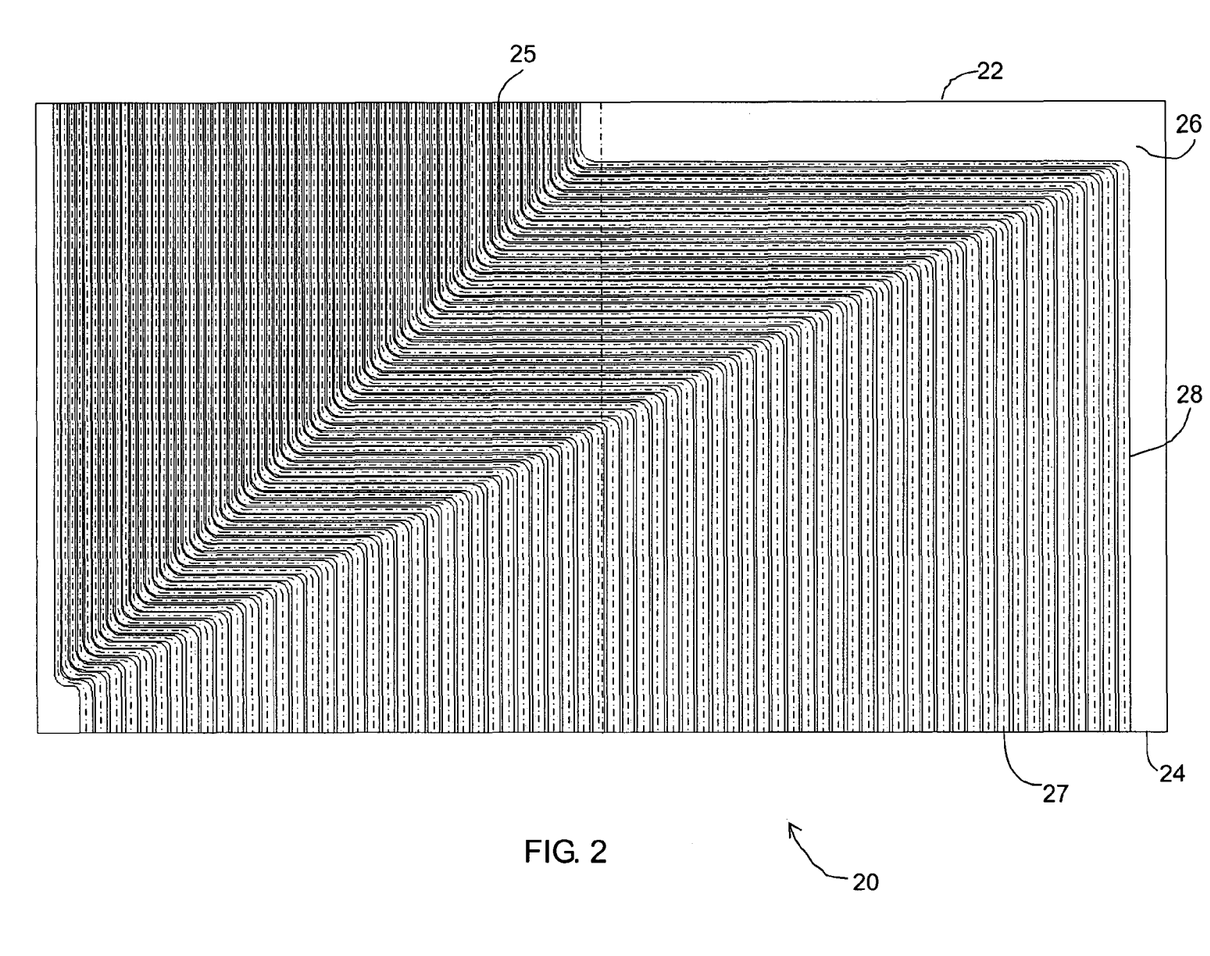
FIG. 2 is a front view of a single plate such as can be used to form a micro-channel distributor in accordance with the present invention.

Referring briefly to FIG. 2, an exemplary plate 20 includes an upstream edge 22, a downstream edge 24, a front surface 26 and a back surface (not shown). Front surface 26 preferably includes a plurality of channels 26 formed therein. Each channel includes an inlet end 25 and an outlet end 27. The channels can be formed by etching or machining or can be pre-formed in each plate 20. The plates are preferably made of a metal or other material that can withstand the operating conditions in which the present invention is applied. Once the desired plurality of channels (flow paths) has been formed in each plate, the plates are stacked. Pressure and heat are applied to the stack, causing the plates to bond together so as to form a single monolithic block. The flow channels remain clear throughout the bonding process, and the result is a block having a plurality of passages therethrough.

This manner of assembly provides a high degree of flexibility in the configuration of the fluid flow paths through the resulting block. Because the channels can be formed as desired and because each plate can be machined, etched and/or pierced before the plates are stacked, fluid flow paths between plates, as well as fluid flow paths in the plane of each plate, can be achieved. Likewise, the configuration of the channels, plates, and the gas distributor itself can be set as desired. For example, the gas distributor may be hexahedral, and may have a cross-sectional flow area that is preferably rectangular and more preferably square. It will be understood that the outer configuration of the present distributor has little direct effect on the operation of the system. Hence, the distributor itself may have a rectangular, square, or round cross-section, for example, and can more than one cross-section along its length. Similarly, the number of fluids that can be passed through a single gas distributor block, either separately or in contact with one another, depends only on the number of inlets and flow passages provided and the configurations of the fluid flow paths through the block.

Referring again to FIG. 1, while channels 26 are not shown in FIG. 1, inlet ends 25 and outlet channel ends 27 corresponding to a plurality of stacked plates 20 are shown. The general direction flow through the distributor 10 is represented by arrow 15. It will be understood that the flow in any given portion of a particular channel may not be in the direction of arrow 15, particularly if channels 26 are tortuous.

One objective of certain embodiments of the present invention is to provide a gas distributor that achieves mixing of two or more gases, as well as distribution of a gas or gas mixture across a desired area. According to one embodiment of the invention, this is achieved by including with the plurality of plates 20 a second plurality of plates (not shown) that have channels describing a second, predetermined flow pattern. In a preferred embodiment, the second flow pattern complements the flow pattern on plates 20 such that gases that enter distributor 10 as separate streams emerge from distributor either as blended streams or a plurality of interspersed streams that result in effective mixing of the two (or more gases). By way of example only, the plates 20 illustrated in FIG. 2, in which a plurality of inlet openings in the left (as drawn) half of the plate are "mapped" to a plurality of outlet openings that span the width of plate 20 could be combined with a plurality of complementary plates in which a plurality of inlet openings in the right half of the plate were mapped to a plurality of outlet openings that also spanned the width of the plate.

When a distributor block is formed by alternating "left" and "right" plates, the result is a distributor in which the flow pattern for a single gas is outlined in phantom in FIG. 1. It can be seen that, in this particular embodiment, for a single gas, the openings that form channel upstream ends 25 are twice as closely packed as the openings that form channel downstream ends 27. The inlet openings for the complementary plates (not shown) would preferably be in the right (as drawn) half of upstream face 12 and the outlet openings would be interspersed with outlet openings 27 in downstream face 14. In this embodiment, one gas is fed into the left (as drawn) side of the distributor and distributed evenly across its downstream face 14, as illustrated in phantom in FIG. 1, and the second gas is fed into the right (as drawn) side of the distributor and also distributed evenly across downstream face 14.

Figure 3:
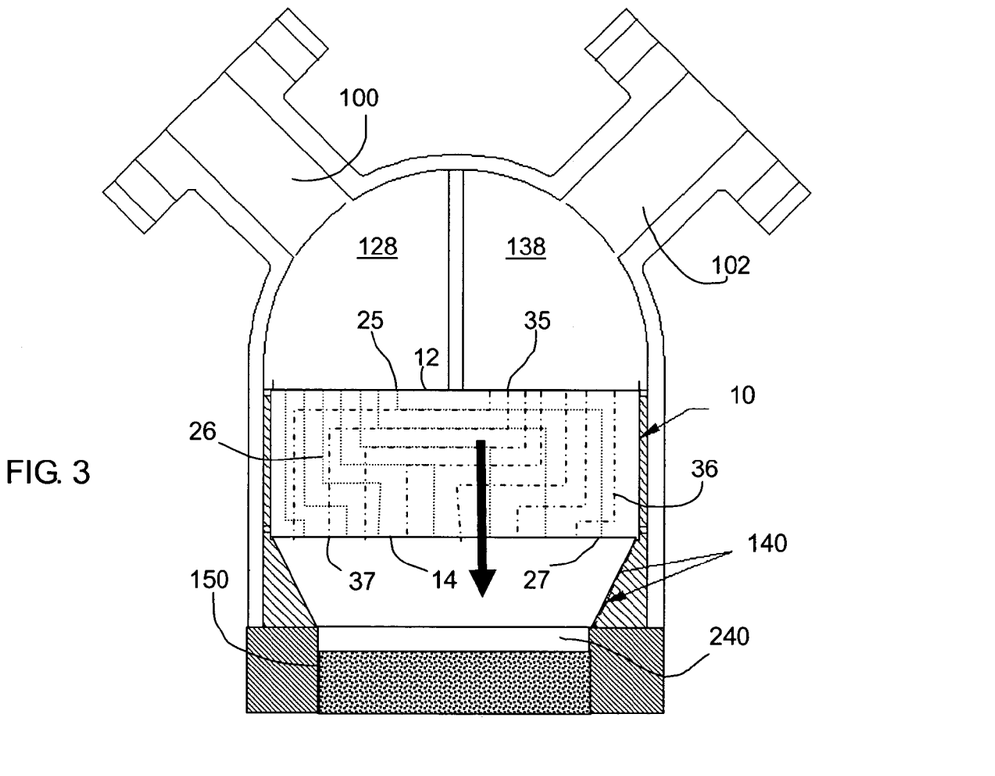
FIG. 3 is a schematic diagram of a micro-channel gas distributor in accordance with a first alternative embodiment of the present invention.

This concept is further illustrated in FIG. 3, in which first and second feed gases are injected into the gas distributor block via separate lines 100, 102, respectively. The positioning of feed lines 100, 102 at the top of each schematic Figure is not intended to imply that the actual feed lines should be next to one another, or parallel, or have any particular configuration.

As shown in FIG. 3, each inlet stream 100, 102 is split between a plurality of separate fluid passages or channels. Specifically, the fluid in feed stream 100 is split between passages 26 and the fluid in stream 102 is split between passages 36. The splitting of each inlet stream preferably occurs in a manifold section 128, 138, respectively. The pressure of each fluid in its respective passages is preferably uniform, but it is not necessary that the pressure of the two fluids be the same. In embodiment shown in FIG. 3, the fluids are maintained in separate flow passages and do not mix during their transit through the gas distributor. They exit the downstream face 14 of gas distributor 10 via interspersed outlets 27, 37, respectively.

An optional zone of reducing cross-section is shown at 140 in FIG. 3. In one embodiment, this zone is used as a mixing zone. In another embodiment, distributor 10 extends into this zone and includes a downstream segment having a cross-sectional area that is different from the cross-sectional area of the segment upstream of it. In preferred embodiments, a catalyst bed 150 is provided at some predetermined distance downstream of distributor 10. The distance determines the volume of an optional chamber 240 between the distributor and the catalyst.

Again, it will be understood that the direction of flow indicated in the Figures is not intended to be an indication that the gases actually flow downward, or in any other direction. Rather, one of ordinary skill will appreciate that reactor systems incorporating one or more gas distributors in accordance with the present invention can be oriented in any suitable manner.

Similarly, for ease of understanding, the Figures show only schematic fluid flow patterns and not the actual flow channels that can be used to produce such flow patterns. It will be understood that the micro-channel gas distributors discussed above can be configured to produce the flow patterns illustrated in the Figures, as well as various other flow patterns. More particularly, it will be understood that various flow channel configurations could be used to generate the two-dimensional flow patterns shown schematically in Figures and 3. Likewise, the two-dimensional flow patterns shown schematically in the Figures can be extended into three dimensions, with a variety of flow channel configurations.

By way of example only, and without limiting the scope of the claims, it is contemplated that the fluid flow channels in the present gas distributor could be configured such that gas streams are divided, combined, turned, and/or straightened within the gas distributor. For example, depending on the positions of the inlet lines relative to the gas distributor, it may be desirable to change the direction of flow of one or more of the streams. If two or more gases are to be combined within the gas distributor, a change in direction can be accomplished before, after, or as the fluids in question are combined.

In an alternative embodiment, while feed streams 100, 102 enter distributor 10 separately and are each split in a respective manifold section 128, 138, as in FIG. 2, individual fluid streams are combined within distributor 10 so as to form combined streams. The result is that each fluid stream leaving the gas distributor already comprises a mixture of feed gases when it exits the gas distributor. In this embodiment, the amount of space that is required between the gas distributor 10 and the catalyst 150 is minimal, since no additional mixing space is needed. In this embodiment, the gas distributor serves to provide an evenly distributed gas flow onto the catalyst. In still another embodiment, feed streams 100 and 102 are not kept separate in the manifold section and thus are allowed to begin mixing before they enter the fluid channels of the gas distributor. Similarly, if desired, additional mixing devices can be added up- or downstream of the gas distributor.

The number of fluid outlets is preferably high relative to the total surface area of the catalyst. For example, it may be preferred to provide at least 7 outlets, preferably evenly spaced across the cross-sectional area of the reactor or catalyst bed. In some embodiments, the number of outlets per square foot is preferably at least 1, and more preferably at least 25. Still other embodiments may have as many as 100, 1000, 2,000, or 6,000 outlets per ft$^2$, more. If the reactant gases are kept separate as they pass through the gas distributor, the number, size and proximity of the outlets is preferably such that the fluids are quickly uniformly dispersed into each other upon exiting the gas distributor block. This can be achieved by having at least 20 outlets of each gas per square foot.

It is preferred that the micro-channel gas distributor be configured so as to minimize the pressure drop across it. In particular, it is preferred that the pressure drop across the gas distributor be minimized to the lowest level that can be achieved while still providing the desired degree of mixing and flow. In some embodiments, this corresponds to a pressure drop of less than 30 psi, preferably less than 10 psi, more preferably less than 5 psi, still more preferably less than 1 psi, and most preferably less than 0.5 psi. Still further, it is preferred that the ratio of the sum of the areas of the inlet openings to the sum of the areas of the outlet openings be between about 1:2 and 1:10, and more preferably between about 1:2 and 1:6. Likewise, in one embodiment it is preferred that the channels each have substantially the same length, so that the flow resistance in each channel is the same. It is further preferred that each channel have at least one change in direction and more preferably at least two turns between the inlet and the outlet, as illustrated in FIG. 2.

In any embodiment of the present invention, a third fluid, or additional fluids, can be passed through the gas distributor block, with or without being combined with the reactant gases. In particular, a heating or cooling medium, such as steam, can be flowed through the gas distributor, in either counter-flow, co-flow, or cross-flow configurations, so as to preheat the feed gases or feed gas mix. The heating or cooling medium-is preferably, but not necessarily, kept separate from the reactant gases, transferring heat to them via conduction through the gas distributor body. As mentioned above, in certain embodiments, the hydrocarbon or reactant gas mixture is preferably preheated to about 30° C.–750° C. before contacting the catalyst.

In preferred embodiments, the closely-packed nature of the fluid passages and corresponding closely-packed nature of their respective outlets yields an outlet flow having a very highly desirable degree of uniformity and homogeneity. In turn, this reduces the risk of undesired reactions and reduces the occurrence of hot spots on the catalyst Process of Producing Syngas A preferred process for producing synthesis gas employs a monolithic or divided catalyst containing a catalyst composition that is effective for catalyzing the conversion of methane or natural gas and molecular oxygen to primarily CO and $H_2$ by a net catalytic partial oxidation (CPOX) reaction. Preferably employing a fast contact (i.e., millisecond range)/fast quench (i.e., less than one second) reactor assembly, a feed stream comprising a light hydrocarbon and an oxygen-containing gas is contacted with the catalyst. The reactor is preferably operated at a reactant gas pressure greater than 1 atmosphere (>100 kPa), more preferably above 2 atmospheres, which is advantageous for optimizing syngas production space-time yields. One suitable reaction regime is a fixed bed reaction regime, in which the catalyst is retained within a reaction zone in a fixed arrangement, as conceptually illustrated in FIG. 4.

Figure 4:
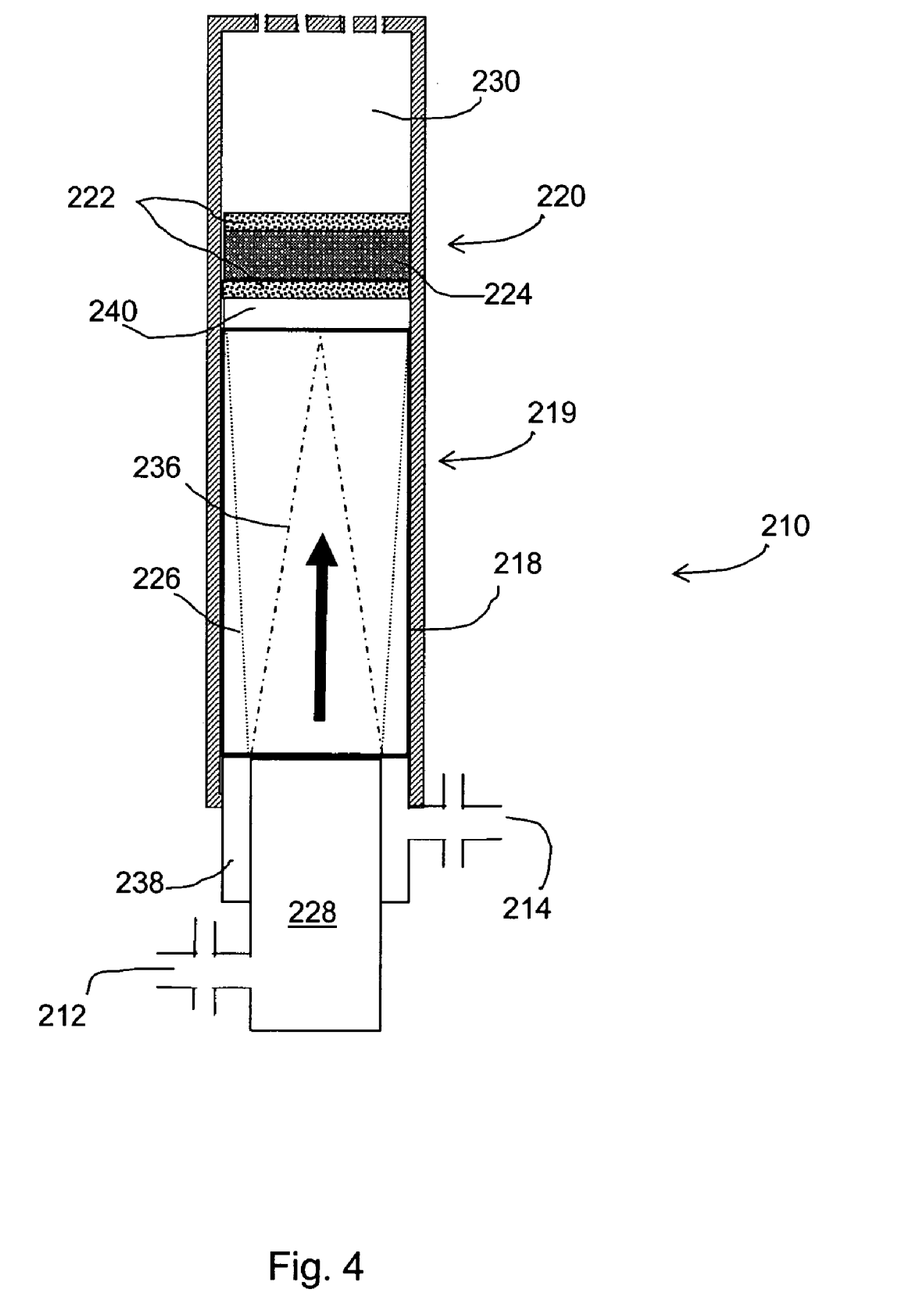
FIG. 4 is a cross-sectional view of the interior of a short contact time reactor employed for synthesis gas production according to an embodiment of the present invention.

Referring now to FIG. 4, a reactor system 210 that is suitable for producing synthesis gas by partial oxidation of a light hydrocarbon, or for carrying out other oxidation reactions, comprises a tube made of materials capable of withstanding at least the temperatures generated by the exothermic CPOX reaction set out in Reaction 3 (in the case of methane as the feed hydrocarbon). Reactor 210 includes feed injection openings 212 and 214, a gas distributor 218, a mixing zone 219, a reaction zone 220 and, optionally, a heating or cooling zone 230.

Figure 5:
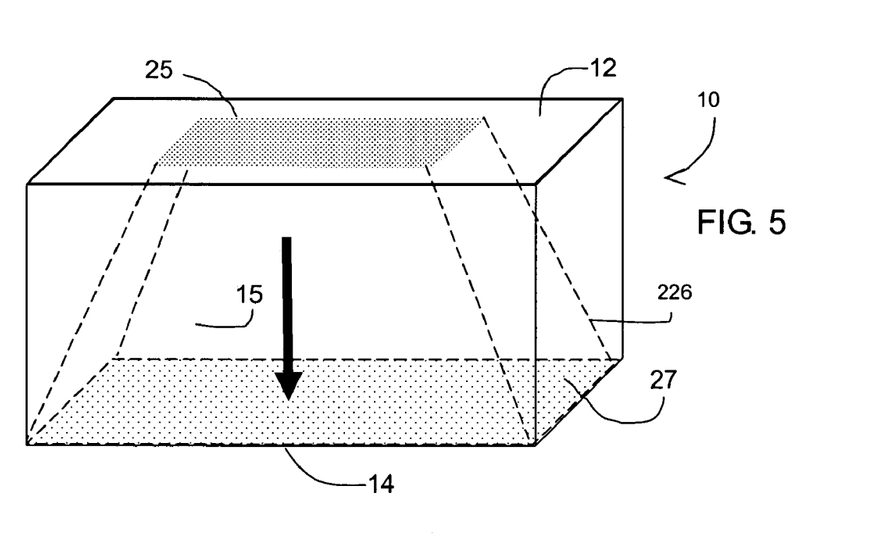
FIG. 5 is a schematic cross-section of a micro-channel gas distributor combined with a manifold, including a schematic illustration of the flow patterns of two reactant gases through the micro-channel gas.

Between injection openings 212 and 214 and mixing zone 219, manifolds 228, 238 receive the reactant gases and apportion each feed stream among a set of flow channel inlets into gas distributor 218. Gas from feed 212 passes through manifold 228 and is distributed generally in the manner indicated by lines 226. Similarly, gas from feed 214 passes through manifold 238 and is distributed generally in the manner indicated by lines 236. A schematic illustration of distributor 218 showing openings for channels corresponding to lines 226 is shown in FIG. 5. It will be understood that the distributor configuration shown in FIG. 1 could likewise be used in the system of FIG. 4, with a corresponding configuration of feed lines and manifolds, or any other desired configuration of the distributor could be used.

Inside gas distributor 218 the gases can be redistributed, combined and/or mixed as desired, depending on the configuration of the channels. Reaction zone 220 preferably includes at least one thermal radiation shield or barrier 222 positioned immediately upstream of a catalyst or catalytic device 224 in a fixed-bed configuration. Radiation barrier 222 is preferably a porous ceramic or refractory material that is suited to withstand the reactor operating temperatures and provide sufficient thermal insulation to the unreacted gases in the mixing zone 219. It is preferred that there be a minimum of void or dead spaces in the areas of the reactor that are occupied by the mixed reactant gas in order to minimize the opportunity for gas stagnation and undesirable combustion reactions to occur before the reactant gas stream comes into contact with hot catalyst. Thus, if a chamber 240 is provided between distributor 218 and catalyst 224, its volume is preferably minimized. A second barrier may be positioned on the downstream side of the catalyst to retain the catalyst bed and to thermally insulate the reacted gases entering cooling zone 230. Such refractory materials are well known in the art. In commercial scale operations the reactor may be constructed of, or lined with, any suitable refractory material that is capable of withstanding the temperatures generated by the exothermic CPOX reaction, or at least 1,600° C., preferably up to about 2,000° C.

The catalyst 224 is positioned in reaction zone 220 in the flow path of the feed gas mixture. The catalyst 224 is preferably in the form of one or more porous monoliths or a bed of discrete or divided units or structures that is held between two porous refractory disks (i.e., irradiation barriers 222). Downstream of reaction zone 220 is an optional device 230 for heating or cooling the gases, such as are known in the art.

In operation, a stream of light hydrocarbon, such as methane, or other feed gas is fed into feed injection opening 212. An oxygen-containing gas, such as air or oxygen is fed into a second injection opening 214, which is preferably positioned close to catalyst 224. It should be understood that the feed injection openings in the reactor, the manifold(s) and the micro-channel gas distributor 218 can be configured differently from the configuration shown in FIG. 4 without affecting the principles or operation of the process. For example, as discussed above and illustrated in. FIG. 2, the flow channels in gas distributor 18 could be configured such that the oxygen is kept separate from the methane and is not mixed with the light hydrocarbon until it exits the gas distributor. In this embodiment, mixing of the gases occurs immediately before or during the contacting of the feed gas stream with a hot catalyst Such configurations may help reduce the occurrence of unwanted side reactions that might otherwise rapidly occur during or after mixing of $O_2$ with the hydrocarbon components but prior to contacting the catalytic surfaces of the reaction zone.

Air or a mixture of air and oxygen can be substituted for the pure oxygen. However, since the presence of $N_2$ in the reactant gas mixture can be problematic (e.g., forming unwanted nitrogen-containing compounds), it is preferable in most cases to use pure oxygen instead of air. The hydrocarbon feedstock may be any gaseous hydrocarbon having a low boiling paint, such as methane, natural gas, associated gas, or other sources of light hydrocarbons or alkanes having from 1 to 5 carbon atoms. The hydrocarbon feedstock may be a gas arising from naturally occurring reserves of methane. Preferably, the feed comprises at least about 80% by volume methane. The hydrocarbon feedstock may also include some steam and/or $CO_2$ a, as sometimes occurs in natural gas deposits.

The methane-containing feed and the $O_2$ containing feed are mixed in such amounts as to give a carbon (i.e., carbon in methane) to oxygen (Le., molecular oxygen) molar ratio from about 1.5:1 to about 3.3:1, more preferably, from about 1.7:1 to about 2.1:1. The stoichionietric molar ratio of about 2:1 ($CH4:O_2$) is especially desirable in obtaining the net partial oxidation reaction products ratio of 2:1 $H_2:CO$. As mentioned above, the hydrocarbon or reactant gas mixture is preferably preheated to about 30° C.–750° C. before contacting the catalyst.

During mixing the feed gases are shielded by radiation battier 222 from radiant heal that is generated downstream in the process. It is preferred that the temperature on the upstream side of barrier 222 be in the range of about 30° C. to about 500° C., preferably no more than about 750° C., to help initiate the CPOX reaction. Excessive preheating the feed gases can cause unwanted homogeneous reactions to occur that reduce the selectivity of the process for the desired CO and $H_2$ products. In some instances, it may also be desirable to briefly supplement the hydrocarbon feed with propane or another pure hydrocarbon to facilitate rapid initiation of the CPOX reaction. After the gases pass barrier 222 they flow past catalytic device 224 and are simultaneously heated to 350° C.–2,000° C., preferably not exceeding 1,500° C., and more preferably staying in the range of about 400° C. to about 1,200° C.

The preheated feed gases pass over the catalyst to the point at which the partial oxidation reaction initiates. An overall or net catalytic partial oxidation (CPOX) reaction ensues, and the reaction conditions are maintained to promote continuation of the process, which preferably is sustained autothermally. The term "autothermal" means that after initiation of the partial oxidation reaction, no additional or external heat must be supplied to the catalyst in order for the production of synthesis gas to continue. Under autothermal reaction conditions the hydrocarbon feed is partially oxidized and the heat produced by that exothermic reaction drives the continued net partial oxidation reaction. Consequently, under autothermal process conditions there is no external heat source required.

The gas flow rate is preferably maintained such that the contact time for each portion of the gas stream that contacts the catalyst is no more than about 200 milliseconds, more preferably under 50 milliseconds, and still more preferably 20 milliseconds or less. This degree of contact produces a favorable balance between competing reactions and produces sufficient heat to maintain the catalyst at the desired temperature. Exposure to the hot catalyst and oxygen partially oxidizes the light hydrocarbons in the feed according to the CPOX reaction (Reaction 4, in the case of methane):

$$CH_4 + \tfrac{1}{2}O_2 \rightarrow CO + 2H_2 \tag{4}$$

It is preferred to keep the stoichiometric molar ratio of carbon: oxygen at about 1.5:1 to 2.2:1, to favor the CPOX reaction. This is best accomplished by monitoring and adjusting during operation the composition, temperature, and flow rates of the feed gases, as further described below. For example, by establishing and maintaining process conditions favoring CPOX over the hydrocarbon combustion reaction (Reaction 5, in the case of methane)

$$CH_4 + 2O_2 \rightarrow CO_2 + 2H_2O \tag{5}$$

the conversion of the carbon atoms contained in the hydrocarbon molecules to $CO_2$ is less likely to occur. In this way the $CO_2$ content of the product gases is minimized and the selectivity for CO and $H_2$ products is enhanced. In some situations it may be helpful to heat the catalyst using external means, at least at the start of the process, so as to facilitate initiation of the exothermic reactions on the catalyst structure. Once the process is commenced, depending on the nature of the reaction, it may be run adiabatically or nearly adiabatically (i.e., without loss of heat), so as to reduce the formation of carbon (e.g., coke) on the surface of the catalyst. The catalyst is preferably heated sufficiently as a result of the exothermic chemical reactions occurring at its surface to perpetuate the CPOX reaction under favorable conditions of reactant gas molar ratios, flow rate and catalyst contact time. Heating by external means, or otherwise adjusting the temperature toward the higher end of the preferred operating range (i.e., 400° C.–1,500° C.) can allow for increases in the rate at which feed gas can be passed through the catalyst structure while still obtaining desirable reaction products.

The hydrocarbon feedstock and the oxygen-containing gas may be passed over the catalyst at any of a variety of space velocities. Space velocities for the process, stated as gas hourly space velocity (GHSV), are in the range of about 20,000 to about 100,000,000 $h^{-1}$. Although for ease in comparison with prior art systems space velocities at standard conditions have been used to describe the present invention, it is well recognized in the art that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of h–1. Under these operating conditions a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time of 10 milliseconds is highly preferred. The duration or degree of contact is preferably regulated so as to produce a favorable balance between competing reactions and to produce sufficient heat to maintain the catalyst at the desired temperature.

In order to obtain the desired high space velocities, the process is operated at atmospheric or superatmospheric pressures. The pressures may be in the range of about 100 kPa to about 32,000 kPa (about 1–320 atm), preferably from about 200 kPa to 10,000 kPa (about 2–100 atm).

The process is preferably operated at a temperature in the range of about 350° C. to about 2,000° C., and preferably less than 1,500° C. More preferably, the temperature is maintained in the range 400° C.–1,200° C., as measured at the reactor outlet.

The product gas mixture emerging from the cooling zone 30 of reactor 10 is harvested and may be routed directly into any of a variety of applications, preferably at pressure. One such application for the CO and $H_2$ product stream is for producing higher molecular weight hydrocarbon compounds using Fischer-Tropsch technology.

When employing either a monolith catalyst or a packed bed of divided catalyst, the surface area, depth of the catalyst bed, and gas flow rate (space velocity) are preferably chosen, or adjusted during operation, as applicable, so as to ensure the desired or optimal conversion efficiency and product selectivities. Under preferred CPOX promoting conditions with a methane feed the net partial oxidation of at least 90% of the $CH_4$ feed to CO and $H_2$ with a selectivity for CO and $H_2$ products of at least about 90% CO and 90% $H_2$ is achieved 2 atmospheres pressure, or more, and at GHSV of 2,000,000 $h^{-1}$ or more.

The present invention has been disclosed in terms of its role in a catalytic partial oxidation process. It will be understood that the present invention has applicability in any catalytic reaction scheme, in which it is desired to mix or distribute reactants prior to contacting them with the catalyst, and particularly those reaction schemes in which it may be desired to heat or cool the reactant gases prior to contacting them with the catalyst. When one of the reactants is an oxygen-containing gas, exemplary reaction schemes include, in addition to partial oxidation of methane, oxidative dehydrogenation and catalytic partial oxidation of hydrogen sulfide.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications and publications cited herein are incorporated by reference. The discussion of certain references in the Description of Related Art, above, is not an admission that they are prior art to the present invention, especially any references that may have a publication date after the priority date of this application.

What is claimed is:

1. A method for distributing at least two gases upstream onto a catalyst, comprising:
    a) providing a gas distributor comprising a body having a plurality of channels therethrough and a plurality of outlets from said channels, said outlets configured on one downstream face of said gas distributor to distribute gas onto the catalyst, wherein a chamber is defined between the one downstream face and the catalyst;
    b) feeding a first gas into the gas distributor;
    c) separately feeding a second gas into the gas distributor simultaneously with step b); and
    d) allowing the first and second gases to flow through the gas distributor, out through the outlets, and into the chamber wherein the first and second gases first come into contact with one another and mix with one another in the chamber while being directed toward and into contact with the catalyst.

2. The method of claim 1 wherein steps b) through d) are carried out such that gases flow across said catalyst at a gas hourly space velocity of at least 20,000 $h^{-1}$.

3. The method of claim 1 wherein steps b) through d) are carried out such that gases flow across said catalyst at a gas hourly space velocity of about 100,000–25,000,000 $h^{-1}$.

4. The method of claim 1 wherein the gas distributor comprises a plurality of plates that have been etched and bonded together.

5. The method of claim 1 wherein the gas distributor has at least 7 outlets.

6. The method of claim 1 wherein the gas distributor has at least 100 outlets per square foot.

7. The method of claim 1 wherein the gas distributor has at least 1,000 outlets per square foot.

8. The method of claim 1 wherein the gas distributor has at least 2,000 outlets per square foot.

9. The method of claim 1 wherein the first and second gases are combined within the gas distributor such that the gas exiting through the outlets comprises a mixture of the first and second gases.

10. The method of claim 1 wherein the first and second gases are not combined within the gas distributor and the first and second gases are mixed between the outlets and the catalyst.

11. The method of claim 1 wherein the pressure drop across the gas distributor is less than 30 psi.

12. The method of claim 1 wherein each channel has an inlet opening and an outlet opening, and the gas distributor has a ratio of the sum of the areas of the inlet openings to the sum of the areas of the outlet openings is between about 1:2 and 1:10.

13. The method of claim 12 wherein the ratio of the sum of the areas of the inlet openings to the sum of the areas of the outlet openings is between about 1:2 and 1:6.

14. The method of claim 1 wherein each channel has an inlet and an outlet and further has at least one change in direction between its inlet and its outlet.

15. The method of claim 1 wherein some channels share an outlet opening.

16. The method of claim 1 wherein some channels share an inlet opening.

17. A process for converting a hydrocarbon-containing feed gas to liquid hydrocarbon products comprising:
   a) providing a catalyst in a syngas reactor and a micro-channel gas distributor positioned upstream of the catalyst in the syngas reactor, wherein a chamber is defined between a downstream face of said gas distributor and the catalyst in the syngas reactor;
   b) flowing the hydrocarbon-containing feed gas and an oxygen-containing gas through the micro-channel gas distributor having a plurality of gas outlets wherein at least 25 outlets per square foot are configured on the downstream face of said gas distributor to produce a reactant gas stream;
   c) maintaining the first and second gases separate until they enter the chamber wherein the first and second gas first come into contact with one another in the chamber and mix with one another in the chamber and are directed toward the catalyst;
   d) reacting the reactant gas stream in the syngas reactor while contacting the reactant gas stream with the catalyst under conditions effective to produce a syngas stream comprising hydrogen and carbon monoxide; and
   e) reacting at least a portion of the syngas stream in a synthesis reactor under conditions effective to produce liquid hydrocarbon products.

18. The process according to claim 17 wherein step de) includes keeping the temperature of the reactant gas stream at about 30° C.–750°C., contacting the reactant gas stream with the catalyst, keeping the temperature of the catalyst at about 600–2,000°C., and maintaining the reactant gas stream at a pressure of about 100–40,000 kPa while contacting the catalyst.

19. The process according to claim 17 wherein the gas distributor is configured such that the hydrocarbon-containing feed gas and the oxygen-containing gas are not combined within the gas distributor, and further wherein the hydrocarbon-containing feed gas and the oxygen-containing gas are mixed after exiting said outlets and wherein the outlets for the first and second gases are both oriented generally toward the catalyst.

20. The process according to claim 17 wherein the hydrocarbon-containing feed gas and the oxygen-containing gas are maintained in separate sets of flow channels with interspersed outlets and do not mix during their transit through the gas distributor to emerge as interspersed streams from the gas distributor via said outlets.

21. The process according to claim 17 wherein the gas distributor has 100 or more outlets per square foot.

22. A method of partially oxidizing a feed gas, comprising:
   providing a catalyst bed comprising a catalyst;
   providing a gas distributor disposed upstream of said catalyst bed, said gas distributor comprising a body having a plurality of channels therethrough, and a plurality of outlets from said channels, said outlets being configured in a downstream face of said gas distributor for distributing gas across the catalyst bed wherein a chamber is defined between the downstream face of said gas distributor and the catalyst bed;
   feeding a feed gas into one set of channels of the gas distributor, and simultaneously feeding an oxygen-containing gas into a separate set of flow channels, wherein the outlets of the separate set of flow channels are interspersed across the downstream face with the outlets of the set of channels into which the feed gas is fed, wherein the gas distributor has at least 20 outlets for each gas per square foot;
   allowing the feed gas and the oxygen-containing gas to flow separately without mixing during their transit through the gas distributor and to exit the downstream face of the gas distributor via said interspersed outlets to first come into contact in the chamber and mix upon exiting the gas distributor to produce a reactant gas stream; and
   contacting the catalyst with the reactant gas mixture while the reactant gas mixture passes over, or through the catalyst at a gas hourly space velocity in the range of about 20,000 $h^{-1}$ to about 100,000,000 $h^{-1}$ under conditions effective to produce a syngas stream comprising hydrogen and carbon monoxide.

23. The method according to claim 22 wherein the channels have substantially the same length.

24. The method according to claim 22 wherein the outlets are distributed evenly across the downstream face.

25. The method according to claim 22 wherein the set of channels for each gas has inlets twice as closely packed as its respective outlets.

26. The method according to claim 22 wherein each channel has at least two turns between its inlet and its outlet.

27. The method according to claim 22 wherein the gas distributor has 100 or more outlets per square foot.

28. The method according to claim 22 wherein the gas distributor has 1,000 or more outlets per square foot.

29. The method according to claim 22 wherein the outlets for the feed gas and oxygen-containing gas are both oriented generally toward the catalyst and the downstream face of the gas distributor is defined by downstream edges of a plurality of stacked plates having their upstream edges at the opposite end of the flow channels from the outlets.

* * * * *